United States Patent [19]

Young

[11] Patent Number: 5,614,240
[45] Date of Patent: Mar. 25, 1997

[54] METHOD OF PRODUCING A BAKED PRODUCT HAVING A SLICED APPEARANCE

[75] Inventor: Robert Y. Young, Golden Valley, Minn.

[73] Assignee: The Pillsbury Company, Minneapolis, Minn.

[21] Appl. No.: 469,076

[22] Filed: Jun. 6, 1995

[51] Int. Cl.⁶ ............................................. A21D 8/06
[52] U.S. Cl. ..................... 426/505; 426/249; 426/496; 426/523
[58] Field of Search ................................ 426/275, 496, 426/502, 503, 505, 523, 128, 138, 249; 249/DIG. 1, 117; 99/426, 430, 372, 439

[56] References Cited

U.S. PATENT DOCUMENTS

| 776,777 | 12/1904 | Dietz . | |
|---|---|---|---|
| 872,837 | 12/1907 | Mio | 249/DIG. 1 |
| 928,493 | 7/1909 | Brown . | |
| 1,015,892 | 1/1912 | Jefferson | 99/430 |
| 1,411,223 | 3/1922 | Retzbach . | |
| 1,505,999 | 8/1924 | Gereke . | |
| 1,599,994 | 9/1926 | Ehrhart et al. | 249/117 |
| 1,672,954 | 6/1928 | Pointon . | |
| 1,971,190 | 8/1934 | Cohen . | |
| 2,002,838 | 5/1935 | Soderholm | 99/426 |
| 2,061,149 | 11/1936 | Garrett | 426/505 |
| 2,071,635 | 2/1937 | Koroa | 426/505 |
| 2,810,338 | 10/1957 | Dawson | 426/138 |
| 3,050,017 | 8/1962 | Mahler | 426/275 |
| 3,093,093 | 6/1963 | Ryan et al. | 249/117 |
| 3,255,717 | 6/1966 | Nervo | 426/503 |
| 3,341,167 | 9/1967 | Weiss | 426/138 |
| 3,398,855 | 8/1968 | Griese . | |
| 3,899,603 | 8/1975 | Brodie | 426/496 |
| 4,009,859 | 3/1977 | Bangert | 426/138 |
| 4,014,451 | 3/1977 | Cannon et al. | 426/505 |
| 4,052,038 | 10/1977 | Marceno | 249/110 |
| 4,431,395 | 2/1984 | Babos | 249/DIG. 1 |
| 4,452,419 | 6/1984 | Saleeba | 249/DIG. 1 |
| 4,571,340 | 2/1986 | Ferrante et al. | 426/523 |
| 4,579,276 | 4/1986 | Manizza | 229/15 |
| 4,656,935 | 4/1987 | Kukura | 426/138 |
| 4,970,949 | 11/1990 | Ferrara et al. | 99/426 |
| 5,232,609 | 8/1993 | Prevost | 249/102 |
| 5,389,768 | 2/1995 | Sarnoff et al. | 219/732 |

FOREIGN PATENT DOCUMENTS

| 2602215 | 8/1977 | Germany | 426/496 |
|---|---|---|---|
| 3611650 | 10/1987 | Germany | 426/275 |
| 5-304877 | 11/1993 | Japan | 426/523 |

*Primary Examiner*—Steven Weinstein
*Attorney, Agent, or Firm*—Janal M. Kalis; Aleya Rahman

[57] ABSTRACT

The present invention relates to a method and device for baking slices of cake, bread or other bakery products to produce a product that has the appearance of a sliced piece of cake or bread. The device includes a baking container with dimensions corresponding to a cake or bread slice. The device also includes a paper liner positionable in the baking container for receiving bread or cake batter.

1 Claim, 2 Drawing Sheets

METHOD OF PRODUCING A BAKED PRODUCT HAVING A SLICED APPEARANCE

BACKGROUND OF THE INVENTION

The present invention relates to a device for making individual slices of cake or quick bread and the slices of cake or quick bread.

Baked goods such as quick breads and cakes have typically been baked as a loaf in a loaf pan or a sheet in a sheet pan. The quick breads and cakes have been served by slicing the loaves or sheets in sizes suitable for individual servings. As anyone can attest to, however, loaf symmetry and sheet symmetry are such that the loaf and sheet slices are of non-uniform shape and consistency.

Under the best of conditions, the loaf has a baked convex top surface. When the loaf is sliced, the slices near the ends of the loaf are smaller in height and width than slices closer to the center of the loaf. The end slices, called "heels" have the smallest height. The end slices also have the toughest texture. Unlike the interior slices, the end slices have one side that is baked to a brown crust.

If the loaf slices are served in an establishment such as a restaurant, the end slices must be discarded because they do not conform to quality control requirements that the restaurant may have. These discarded slices are wasteful and add a significant cost to businesses such as restaurants and food manufacturers.

The Retzbach patent, U.S. Pat. No. 1,411,223 describes a box that is provided with a liner formed of a single sheet of paper. The lined box is filled with a pastry dough. The filled, lined box is placed in an oven to bake the dough. Because of the paper lining in the box, the product is baked uniformly throughout while only the top is browned.

The Marceno patent, U.S. Pat. No. 4,052,034 describes a baking pan having an insert that divides the pan into discrete baking compartments. The baking compartments include a plurality of opposing and intersecting wall members. The insert is used to make cupcakes.

The Manizza patent, U.S. Pat. No. 4,579,276 describes a combined baking and display tray for presenting shaped bakery products. The tray is triangular and is provided with a divider that divides the tray into crescent shaped compartments for retaining dough in an individual curved crescent shape during baking.

The Sarnoff et al. patent, U.S. Pat. No. 5,389,768 describes a circular microwavable chip maker having a row of spacers defining slots between each adjacent pair of spacers. Thin food items are retained in the slots in a spaced array to facilitate cooking in a microwave oven.

DETAILED DESCRIPTION OF PREFERRED EMBODIMENTS

Figure 1:
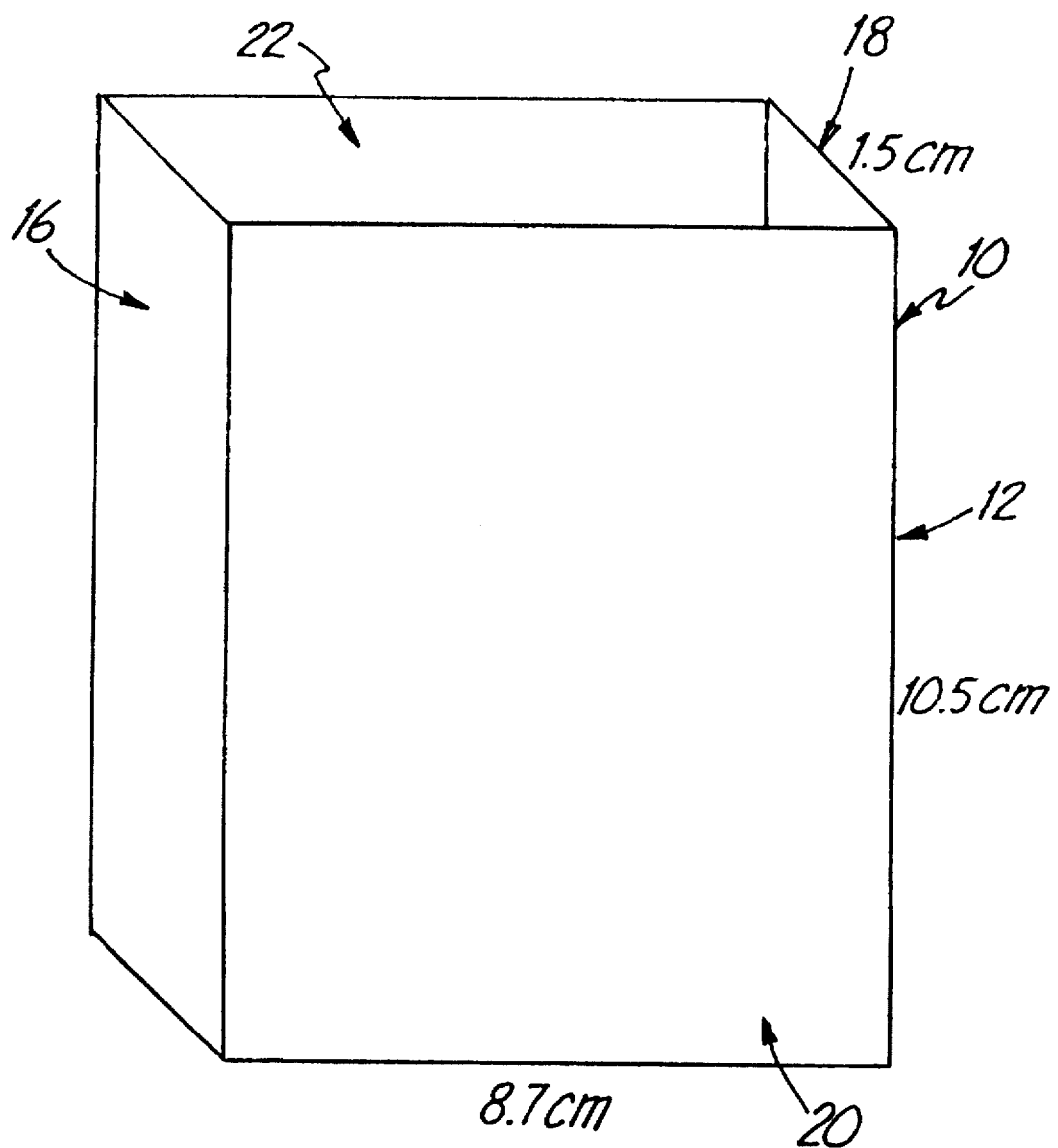
FIG. 1 shows one embodiment of a container for shaping and baking a quick bread or cake slice product.

The device of the present invention, illustrated generally at 10 in FIG. 1, for making a single slice of a cake or quick bread, also referred to as a slice product, includes a container 12 for baking the single slice of the quick bread and a paper liner 14 insertable in the container for receiving cake or quick bread, batter or dough.

Each of the liner 14 and the container 12 have four sides, two opposing narrow sides 16 and 18 and two opposing wide sides 20 and 22. The liner 14 is sized to fit within the container 12. The liner 14 is made of a paper parchment suitable for contacting food products and suitable for exposure to baking temperatures.

Figure 3:
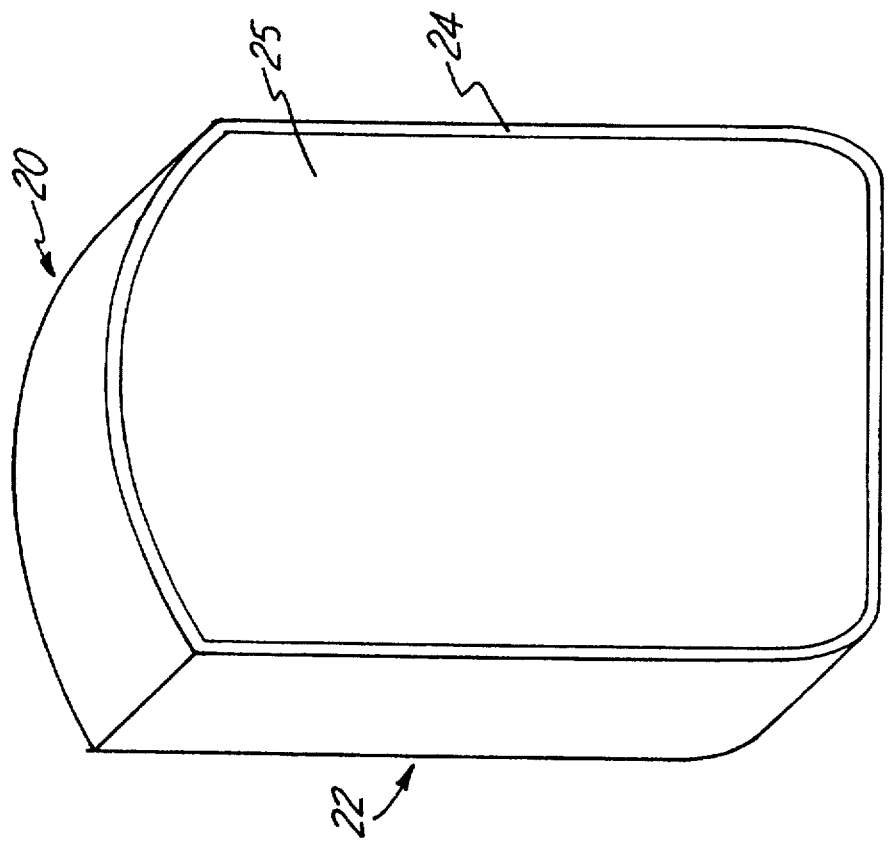
FIG. 3 shows one perspective view of a slice product baked in accordance with the present invention.

One slice product embodiment, illustrated generally at 20 in FIG. 3, includes a slice body 22 that includes a crusty, exterior perimeter 24 and a tender interior 25, lighter than the perimeter 24. The perimeter 24 encloses the interior 25.

It has surprisingly been found that use of the device of the present invention on a mass production scale can reduce process time by about 80% as compared to process time required for making conventional loaves. One area of time and energy savings is baking the loaves. Baking time for a conventional loaf is about 60 to 70 minutes. Baking time for the slice product made in accordance with the present invention is about 20 minutes.

After baking, conventional loaves must be cooled, depanned and cooled outside the pan prior to slicing in order to reduce loaf texture damage upon slicing. Slicing a loaf before it has sufficiently cooled results in undesirable damage to the loaf texture and may cause the entire slice to fall apart. Additionally, slicing into a portion loaf before it has sufficiently cooled may adversely affect the entire loaf because of its fragile structure. Typically, cooling, depanning and further cooling can take up to as long as about 120 minutes after removing a conventional loaf from the oven.

Virtually no cooling or depanning time is required for the slice product of the present invention, therefore significantly reducing the process time. Additionally, the slice pan device eliminates time required to slice the loaf and permits immediate freezing of the slice products after baking.

One other surprising feature obtained with the device 10 of the present invention, is that slices of cake and quick bread can be separately prepared that are uniform in size, texture, moistness and appearance, thereby substantially eliminating waste. Additionally, the slice products appear as if they were sliced from a traditional loaf. Unlike conventional bread pans or cake loaf pans, the device 10 of the present invention makes a product that is free of "heel" slices.

The finding is surprising because in a device such as a muffin pan which makes muffins from muffin dough which is added to paper liners, a portion of the muffin that is baked in contact with the liner turns brown and has a tougher texture than the interior of the muffin. It has surprisingly been found in the present invention however, that when the dough or batter is positioned in the liner 14 and corresponding container 12 and baked, the outer perimeter of the baked product 24 is relatively darker in color while the interior 25 is tender and lighter in color resembling texture and appearance of a true slice from a loaf.

It is believed that baking a batter or dough in the pan and liner device 10 of the present invention creates a heating profile across the dough in which the narrow sides of the dough heat faster than the interior, thereby forming a darker "crust." The wider sides take longer to heat and are lighter in color and texture than the crust, resembling an interior loaf slice. A differential heating profile in the pan 12 that is imparted through the liner 14 to the dough results in an individually baked product that looks like a slice from a loaf.

In addition to an improved uniformity in slice color and texture, the slice products can safely and efficiently be processed, prepared or served while the product is still somewhat warm. Cutting a loaf may destroy the structural integrity of the loaf particularly if the cutting is performed while the loaf is warm. This destruction adds to the amount of loaf product that has to be discarded. The device of the present invention avoids this possibility of waste entirely by forming an individual slice product.

As discussed, the device includes the first baking container 12 such as is illustrated in FIG. 1. The baking container is shaped in the manner of a loaf slice, preferably having a depth narrower than its width. In one embodiment, the baking container 12 has a width of about 8.7 centimeters, a height of about 10.5 centimeters and a depth of about 1.5 centimeters. Preferably, the baking container 12 is made of a highly conductive material such as stainless steel.

In other embodiments, the loaf slice dimensions may include the width greater than the height dimension, and the width dimension substantially equal to the height dimension. It is also believed that the slice may be of irregular shape, such as a wedge, or of a symmetrical shape, such as a slice of a sheeted cake.

Figure 2:
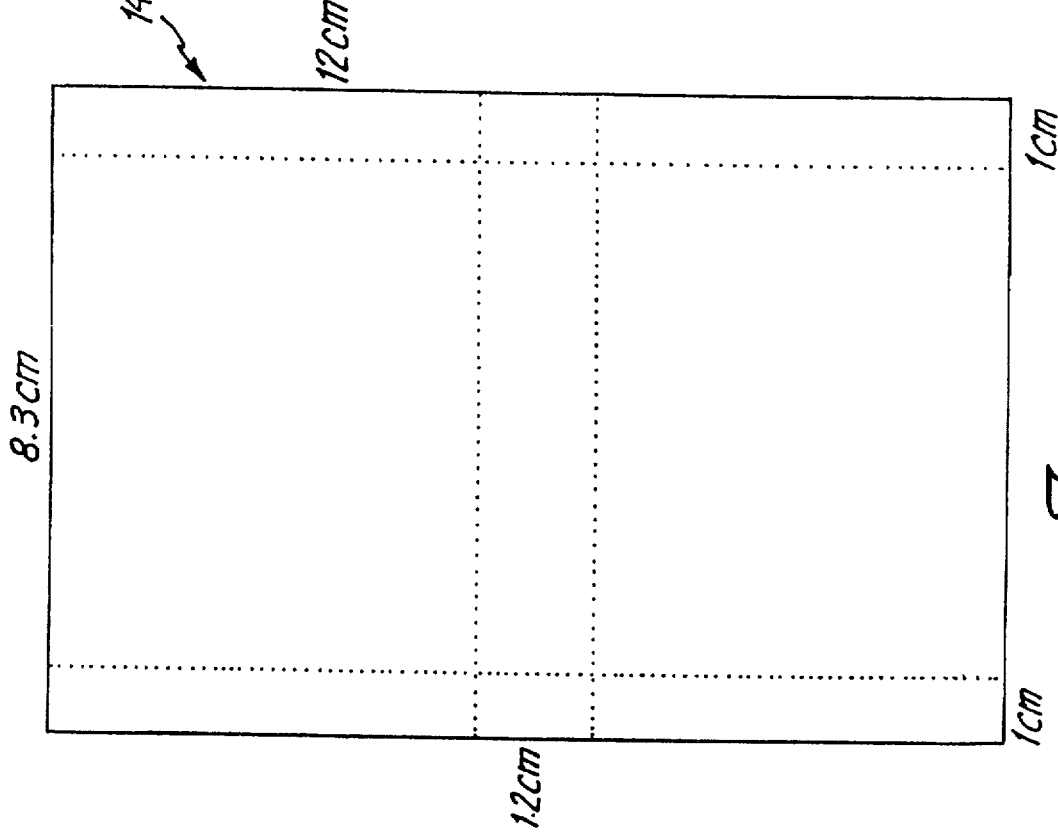
FIG. 2 shows a top, open view of one embodiment of a paper liner for making one slice of cake or a quick bread.

The heat resistant parchment paper liner such as is shown in an open position outside of the container 12 in FIG. 2 is placed in the baking container 12. The liner 14 can have any configuration that fits within the container 12. In one embodiment, the parchment paper liner has a width of about 8.3 centimeters, a length of about 12 centimeters and a depth of about 1.2 centimeters. The paper may be folded into a rectangular pouch-type liner and may be sealed in a manner that will contain the dough or batter placed within the paper liner 14. The parchment paper liner 14 may be sealed in any conventional manner.

Preferably, the parchment paper liner material can withstand a baking temperature of up to about 450 degrees Fahrenheit without degrading. The paper may be coated with a heat resistant material such as VPSI teflon. In one embodiment, the parchment paper was supplied by Bleyer Industries, Inc. of Wakefield, Mass.

A dough or batter is received by the liner 14. In one embodiment, about 60 to 63 grams of batter was received by the liner 14. As discussed, it has interestingly been found that the combination of the liner 14 and baking container 12 with the approximate dimensions described make a cake or quick bread slice that closely resembles a conventional slice from a loaf. The lined container 10 with dough is placed on a holding rack and baked at 350 degrees Fahrenheit to make a baked slice. The baked slice may be frozen at −10 degrees Fahrenheit.

The baked slice product may be toasted in a toaster. In one embodiment, the slice product was frozen at 0 degrees Fahrenheit prior to toasting. The toaster was set at a medium level, with a toast time of 1 minute ±10 seconds. The frozen slice product was inserted into the toaster, toasted and removed about 30 seconds after the slice product "popped" from the toaster. By increasing the baking time or temperature, the slice product can be made to resemble an already toasted slice of quick bread or cake.

The parchment paper liner 14 has a toaster resistant feature that enables consumers to toast the slice product with or without removing the liner. In one test, after toasting a slice product with the liner for 5 cycles in a medium temperature setting, the parchment paper was not burnt, and the bread slice product surface was browned and crusty.

The following example is presented to exemplify one embodiment of the present invention and is not intended to limit the present invention.

EXAMPLE

Quick bread slices were tested for texture rigidity and compared to slices from a conventional loaf baked with ingredients from the same recipe. The test included cooling the loaf and slice to 40 degrees Fahrenheit and slicing the bread loaf to a sample with a thickness of 15 millimeters, which was the thickness of the slice baked in accordance with the present invention. Each of the samples was;lifted by holding about ⅓ of the slice and held horizontally. The time required for the sample to break was measured. In one cinnamon swirl product, the slice from a conventional loaf broke at 0 to 5 seconds. The slice of the present invention did not break even though lifted more than 3 minutes. The cinnamon swirl product was made with the following ingredients:

| Ingredient | % of Total Weight |
| --- | --- |
| Sugar | 23.0 |
| Water | 22.0 |
| Eggs | 10.0 |
| Flour | 23.0 |
| High Fructose Corn Syrup | 3.0 |
| Oil | 11.0 |
| Flavoring | 5.0 |
| Misc. Ingredients (coloring, texturizing) | 3.0 |

The device of the present invention is usable for making quick bread and cake slice products from any conventional recipe. It is believed that the device of the present invention is preferred for making slices of fragile quick bread and cake products, such as bread and cake products containing flavored swirls. The flavored swirls include the cinnamon swirl described and fruit flavored swirls. As described above, one swirled product tested had a reduced fragility as compared to a slice from a conventional loaf.

Other fragile quick breads include those having chunky or moist ingredient additions, such as fruit, cheeses, cream-based fillings, and the like. Because the bread or cake structural matrix is interrupted by these additions, the structure tends to break at these interruptions, imparting an overall fragility to the bread or cake. It is believed that by making bread or cake in accordance with the present invention, the batter or dough is subjected to more localized heat and therefore quickly attains a more rigid structure, without losing the desired textural attributes of a sliced product due to the reduced baking time.

Although the present invention has been described with reference to preferred embodiments, workers skilled in the art will recognize that changes may be made in form and detail without departing from the spirit of the invention.

What is claimed is:

1. A method for producing a baked product comprising:

providing a baking container comprising a narrow, closed bottom, two opposing, upright, wide sidewalls, two opposing, upright, narrow sidewalls, and a narrow open end at the top of the sidewalls, said container sidewalls being dimensioned to produce a baked product when batter is cooked in the container having a shape that includes two broad substantially flat faces and narrow side edges with said broad flat faces corresponding to said opposing wide sidewalls and said narrow side edges corresponding to said opposing narrow sidewalls and closed bottom;

positioning a liner made of paper into the baking container to fit an interior shape of the container and line the container;

adding a batter of quick bread or cake to the lined container; and baking the batter within the lined container; said being not more than about 20 minutes and said container being dimensioned so that the narrow side edges of said batter are heated faster than the broad flat faces to produce a baked product whose narrow side edge are darker than the broad faces so that the side edges appear to be a crust and the broad flat faces appear to be exposed slice faces such that the baked product has the appearance and dimensions of a sliced piece of cake or bread that has been sliced from a larger loaf.

* * * * *